United States Patent
Isidore

(10) Patent No.: US 9,639,510 B2
(45) Date of Patent: May 2, 2017

(54) ADVANCED EDITING AND INTERFACING IN USER APPLICATIONS

(71) Applicant: Eustace Prince Isidore, Austin, TX (US)

(72) Inventor: Eustace Prince Isidore, Austin, TX (US)

(*) Notice: Subject to any disclaimer, the term of this patent is extended or adjusted under 35 U.S.C. 154(b) by 606 days.

(21) Appl. No.: 13/961,083

(22) Filed: Aug. 7, 2013

(65) Prior Publication Data

US 2015/0046800 A1     Feb. 12, 2015

Related U.S. Application Data

(62) Division of application No. 12/869,742, filed on Aug. 26, 2010, now Pat. No. 8,510,649.

(60) Provisional application No. 61/237,001, filed on Aug. 26, 2009.

(51) Int. Cl.
    *G06F 17/00*     (2006.01)
    *G06F 17/24*     (2006.01)

(52) U.S. Cl.
    CPC ................ *G06F 17/24* (2013.01)

(58) Field of Classification Search
    CPC .................................................. G06F 17/24
    See application file for complete search history.

(56) References Cited

U.S. PATENT DOCUMENTS

| | | | | |
|---|---|---|---|---|
| 7,111,234 B2* | 9/2006 | Peck | | G06F 17/24 715/255 |
| 8,171,387 B2* | 5/2012 | Lombardo | | G06F 17/2288 715/200 |
| 2005/0262521 A1* | 11/2005 | Kesavarapu | | G06F 9/543 719/320 |
| 2014/0101553 A1* | 4/2014 | Nagel | | G06F 3/0482 715/728 |

OTHER PUBLICATIONS

Lee, Make Use of, "Sort, Shuffle, and Organize Your Plain Text Lists With These 3 Web Tools," Jul. 26, 2013, p. 1-7, available at http://www.makeuseof.com/tag/sort-shuffle-and-organize-your-plain-text-lists-with-these-3-web-tools/.*
EditPad Pro, retrieved from Internet Archive Wayback Machine, captures of website from 2011-2012, p. 1-5, available at https://web.archive.org/web/20120114002443/http://www.editpadpro.com/manual/epponly.html.*

* cited by examiner

*Primary Examiner* — Amelia Tapp
(74) *Attorney, Agent, or Firm* — Isidore PLLC

(57) ABSTRACT

A method performed within a content editing device provides advanced editing functionality for use within application user interfaces having selectable content. The method provides automatic content insertion following a selection of an end location within the target document and selection of content for insertion at the selected end location. An editor moves content around within one or more documents by tagging the end location and selecting the content that is to be moved or copied to that end location. The method further (Continued)

enables efficient re-arrangement of multiple selected contents within a single document or across multiple application user interfaces by tagging each of the selected content with a sequence tag indicative of the relative content location within the re-arranged sequence of content. Once the content has been tagged, a selectable paste option automatically orders the various contents at the end location in correct sequence relative to each other.

22 Claims, 10 Drawing Sheets

ADVANCED EDITING AND INTERFACING IN USER APPLICATIONS

PRIORITY CLAIM

The present application is a divisional of U.S. patent application Ser. No. 12/869,742, filed on Aug. 26, 2010 and titled, "Advanced Editing and Interfacing in User Applications," which claims priority from U.S. Provisional Patent Application No. 61/237,001, filed on Aug. 26, 2009. The entire content of both documents are incorporated herein by reference.

BACKGROUND OF THE INVENTION

1. Technical Field

The present invention generally relates to data processing devices and in particular to user applications on data processing devices. Still more particularly, the present invention relates to improve user interface and editing features within user applications on data processing devices.

2. Description of the Related Art

Many user applications on electronic devices, such as data processing devices and more advanced mobile communication devices (e.g., smart phones) allow some level of user interfacing with and manipulation of visible content displayed during use of the application. In word processing applications, for example, a user is able to perform one of several functions, including, for example: (a) generating a "document" utilizing some sort of input device (or uploading/downloading the document from another device or storage); and (b) editing content within the document, which may include: (i) inserting content within the documents; and/or (ii) moving/copying portions of the content from one location to another within the document, utilizing a cut and paste functionality, for example, or a copy and paste functionality; in addition to many other functions.

Use of a graphical user interface (GUI) and input devices, such as a mouse and keyboard, a touchpad, or touch screen, to perform editing functions within an existing document enables the user to view the content at some point while the user performs the editing function. Often times, the user desires to perform a specific editing function that enables the user to move/copy content within a document from a first/original location to another/ending location. To achieve this movement/copy of content, application and/or operating system (OS) developers have provided the cut and paste functionality and the copy and paste functionality. Using the cut/copy and paste functionality(s) in a text-based document for example, a user is able to select certain text to be moved, copy/delete that text from its current original location, and then paste the text in the ending location by scrolling up/down through the document to the ending location. This cut and paste (or copy and paste) functionality also allows a user to move content across multiple documents. With a multiple document copy/paste operation, similar to the single document cut and paste operation, the user must first select and cut/copy the desire content, open the next document or switch to the screen on which the next document is displayed, and then paste the contents in the selected location within the second document.

One more recent enhancement made to cut and paste functionality involves the inclusion of a cut and paste clipboard that stores one or more content as the content is cut/copied. This cut-and-paste clipboard enables multiple contents to be stored on the clipboard. The individual contents may then be later pasted at "scrolled-to" locations within the document. While this enhancement provides some added benefits, there are significant limitations in the existing editing functions available to those persons who edit a large number of documents and/or documents with lots of pages of content. One such limitation is that the editor is faced with the problem of having to recall or find a previous location in the document to which the content on the clipboard is to be pasted. This problem increases exponentially as more content is copied to the cut-and-paste clipboard memory.

SUMMARY

Disclosed are a method, a content editing device and a program product that provides advanced editing functionality for use within user applications on a device in which the application presents editable content on a user interface. In a first principal embodiment, a method provides automatic paste or automatic insertion functionality following a copy or cut function by an editor of the content within a document being edited on the user device. The automatic paste/insertion functionality, which is also referred to as a "retrieve with insert" functionality, enables the editor (user of the application) to automatically populate an ending location with content that is copied or cut from and original location. The operating system (OS) and/or the user application is enhanced with executable code (referred to as the advance editing and interfacing (AEI) utility) that enable these advanced editing functions within the application. With these executable code modules/elements provided within the available executable program/OS code, the editor is able to first mark an ending (destination) location for the content to be cut/copied, then select (copy or cut) the content(s) desired to be placed in that location. Following the selection of the content, the OS/application (via the executing code of the AEI utility) automatically populates the end location with the content. Alternatively, in one embodiment, the utility presents the editor with options on pre-marked or pre-selected ending locations and the editor may then select an insert function displayed to the user to populate the pre-selected location with the content.

In one embodiment, the content is automatically populated upon selection following an initial selection by the editor of the ending location. Utilizing this functionality, the editor identifies the ending location to which content is to be moved prior to selecting the content. The AEI utility stores the location and monitors/waits for the editor to then perform a cut or copy function. When the content is automatically inserted, a tag or special marking is placed on or reflected within the content such that the editor is able to quickly view the newly inserted content at the ending location. The editor may undo the insertion utilizing the available undo options of the application/OS. Alternatively, in one embodiment, a special "AE undo" feature is provided along with any content that is automatically inserted via the functional applications of the described embodiments. The AE undo both removes the content from the ending location and also jumps back to the original/start location so that the editor is made aware (reminded) of the location from which the content was original copied/cut. If the content was originally cut (i.e., not copied), the AE undo also reinserts the content in the start location. Except for identifying the ending location and then finding the content, the editor does not have to scroll through the document to complete the actual retrieve with insert function once the content is selected.

In a second principal embodiment, a method is provided that extends the above features of the first principal embodiment beyond a single content retrieve with insert function. In the second embodiment, the method enables efficient re-arrangement of multiple individual content (or blocks of content) within a single document or re-arrangement/movement of content across multiple documents. With this embodiment, the AEI utility assigns numeric (or other sequenced) tags to different selected content. The tags indicate a selected order in which the editor wished the content to be presented in a final document or within the same document. A first content selection (e.g., a sentence (or a sub-sentence, phrase, clause, word, etc.), a paragraph, a plurality of sequential paragraphs, or a plurality of pages, or an entire first document (among multiple documents), or a graphic or image, or a table or data) is tagged with a first tag (which may be a number or alphanumeric character or some other sequencing method). When numbers are utilized, the tags may range from one (1) to N, where N represents the largest integer number of individually tagged content that can be re-arranged within the particular implementation, and is either a design choice or a user settable variable. Following the tagging of the first selection, a second content selection is tagged with a second tag within the range of the sequence (e.g., a second number within the range of one to N, but not the same number as the first number). This tagging of selected content may then be continued for N different content, with each content assigned a unique number from one (1) to N. In one implementation, the content may be selected across multiple different documents for ultimate ordered insertion into a single ending location of a single document. In one extension of the present embodiment, sub-content tagging is also supported, where a sub-sequence may be assigned (e.g., 1, 2a . . . n, 3, 4, where a . . . n, represents n sub-elements arranged as subparts of the second set of content that are to be arrange relative to each other following content 1 and before content 3).

In one embodiment, the ability to tag specific content is provided as a selectable option within a drop down menu accessible via one or more user inputs, such as with menu generated by right click of the pointing device button or opening of a menu option within the top level "Edit" menu function (e.g., in Microsoft OS documents). Other mechanisms are contemplated for accessing and selecting the option to tag specific content and for providing the further option of selecting a specific number within the allowable range to assign to the specific content, and these alternate mechanisms fall within the scope of the described embodiments. With the multiple different content tagged with unique numbers, the editor is then able to select a "combine with sort" function of the AEI utility, which produces the following: (a) sequentially arranging the individual content in the sequential order of the tags (i.e., based on the incremental sequence of the tags, e.g., 1, 2, 3, . . . N assigned to the selected content); (b) creating a new document with the re-arranged ordering of content, perhaps as a "re-arrange version" of the original document (this preserves the original document in case the editor desires to keep the original document); and (c) allowing targeted insertion and ordering of different selected content using the retrieve with insert function for multiple different content in near simultaneous and ordered insertion at the ending location. In one embodiment, a mark-up version of the original document is created when track changes is activated prior to the re-arrangement. The marked up version may show the tag (number) of the different content that is moved/re-arranged. The tag may be indicated proximate to the visible deleted content at the original content location. Selection of the tag then jumps to the new insertion point within the same document or a different document. Swapping of content between documents is also contemplated utilizing a similar mechanism.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF ILLUSTRATIVE EMBODIMENTS

Figure 1:
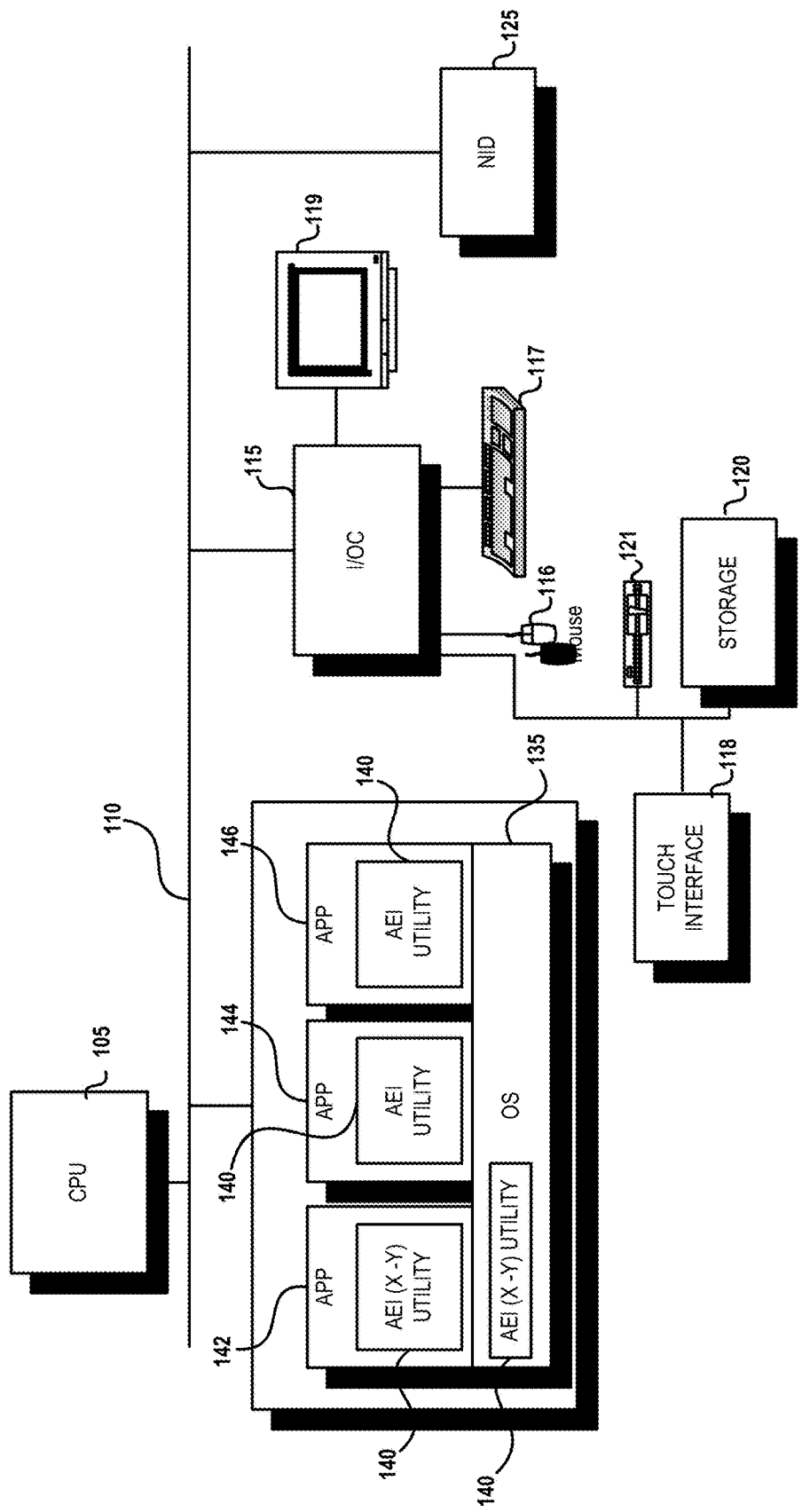
FIG. 1 is a block diagram illustrating components of a computer system within which embodiments of the invention may advantageously be implemented.

The embodiments described herein provide a method, a content editing device and a program product that provides advanced editing functionality for use within user applications on a device in which the application presents editable content on a user interface. Two principal embodiments are presented, both having alternate implementations or secondary embodiments. In a first principal embodiment, a method provides automatic paste or automatic insertion functionality following a copy or cut function by an editor of the content within a document being edited on the user device. The automatic paste/insertion functionality, which is also referred to as a "retrieve with insert" functionality, enables the editor (user of the application) to automatically populate an ending location with content that is copied or cut from and original location. In the second principal embodiment, a method extends the above features of the first principal embodiment beyond a single content retrieve with insert function. In the second embodiment, the method enables efficient re-arrangement of multiple individual content (or blocks of content) within a single document or re-arrangement/movement of content across multiple documents. With this embodiment, the AEI utility assigns numeric (or other sequenced) tags to different selected content. The tags indicate a selected order in which the editor wished the content to be presented in a final document or within the same document.

Aspects of the embodiments provide a method performed within a content editing device provides advanced editing functionality for use within user applications having editable content on a user interface. The method provides automatic paste/insertion functionality following a selection of a destination/end location within the document and a subsequent selection of content for insertion at the selected end location. An editor moves content around within the document by tagging the end location and simply selection the content that is to be moved/copied to that end location. The method further enables efficient re-arrangement of multiple individual content blocks within a single document or across multiple documents by tagging each content with a sequence number indicative of the relative location of that content within the desired re-arranged sequence of content. Once the content has been tagged, a selectable option automatically orders the content in correct sequence relative to each other and/or to existing content in the resulting document.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). The specific numerals assigned to the elements are provided solely to aid in the description and not meant to imply any limitations (structural or functional) on the invention.

It is also understood that the use of specific parameter, component, variable, or function names are for example only and not meant to imply any limitations on the invention. The invention may thus be implemented with different nomenclature/terminology utilized to describe the parameters/components/variable/functions, without limitation. It is appreciated the term "content editing device", as utilized herein, refers to any electronic device that provides content, which may be edited by a user/operator of the device. Also, within the described embodiments, the user/operator of the device is interchangeably referred to as an "editor", and the various modifications and other functions being performed within the document are referenced herein as editing functions. Finally, the term "document" is utilized herein in a general sense to refer to any form of electronic user interface that presents content or accepts content (from another source) which an editor may cut, copy, move, paste, insert, or otherwise re-arrange with the presented interface. General examples are illustrated with a MSWord document and an MS Excel® Spreadsheet, both executing within a Windows® operating system (OS), and all three software being provided by Microsoft Corporation.

With reference now to the figures, FIG. 1 depicts a block diagram representation of a data processing system (or other content editing device) within which features of the invention may be advantageously implemented. While described in the context of a data processing device, it is understood that all features of the above embodiments of the invention are fully applicable to document processing or content manipulation (editing) on mobile devices, including but not limited to, smart phones, laptops, netbooks, personal digital assistants (PDAs), IPODs™, as well as any form of computer devices, including desktops, laptops, and servers. Data processing system (DPS) 100 comprises a central processing unit (CPU) 105 coupled to a memory 130 via a system bus/interconnect 110. Also coupled to interconnect 110 is an input/output controller (I/O Controller) 115, which controls access by several input devices, of which mouse 116 (an example pointing device), keyboard 117, and touch interface 118 are illustrated. I/O Controller 115 also controls access to output devices, of which display 119 is illustrated. Display 119 may comprise a touch screen interface in one embodiment, which operates as both a touch input and a visual output mechanism. DPS 100 may also comprise a storage 120 within which code/instructions/data may be stored and utilized during operation of DPS 100. In order to support use of removable storage media, I/O Controller 115 may further support one or more USB ports (not specifically shown) and compact disk Read/Write (CDRW)/digital video disk (DVD) drive 121.

DPS 100 further comprises network interface device (NID) 125 by which DPS 100 is able to connect to and communicate with an external device or network (such as the Internet). NID 125 may be a modem or network adapter and may also be a wireless transceiver device. In the mobile device implementation, a separate wireless transceiver may be provided within the device, and several of the illustrated components may exist on a single integrated chip within the device with the I/O devices located on the external casing of the device. In such embodiments, as with the general DPS embodiment, download of an application (app) or a utility from a server, may be supported as well. The server 170 may be associated with the mobile device (e.g., a wireless service provider) or with an accessible server of a provider of OS extensions including the AEI functional modules for download.

Those of ordinary skill in the art will appreciate that the hardware depicted in FIG. 1 may vary. Other components, or similar components, arranged in a different manner may be used in addition to or in place of the hardware depicted. Thus, the depicted example is not meant to imply architectural limitations with respect to the present invention.

Various features of the invention are provided as software code stored within memory 130 or other storage 120 and executed by CPU 105. Thus, as shown by FIG. 1, in addition to the above described hardware components, DPS 100 further comprises a number of software components, provided within memory 130, including operating system (OS) 135 (e.g., Microsoft Windows®, a trademark of Microsoft Corp, or GNU®/Linux®, registered trademarks of the Free Software Foundation and The Linux Mark Institute) and one or more software applications, word processing application 142, spreadsheet application 144, and other user applications 146 (collectively user applications 142-146) More specific to the described embodiment, DPS 100 also includes code for enabling the various advanced editing and interfacing (AEI) features and functionality described herein. For simplicity, the collective body of code that enables the AEI features/functions is illustrated as and referred to herein as AEI utility 140. In actual implementation, AEI utility 140 is added/provided as an enhancement to the OS 135 and those features are extended to the user applications 142-146 to provide the various different functionality of the first and second principal embodiments and sub-embodiments thereof, as described herein.

General implementation of the functions related to AEI utility 140 are performed during execution of OS 135 and one or more of user applications 142-146), with the functions of AEI utility 140 selectively executed by CPU 105 when an editor initiates/triggers a tagging of an end location within a document with editable content. According to the illustrative embodiment of the first principal embodiment, when CPU 105 executes AEI utility 140 in conjunction with an executing application, AEI utility 140 enables completion of a series of functional processes (some in response to received/detected input by the editor of the document content) comprising: (1) marking an ending location for insertion of "to be selected" content; (2) detecting selection of the content to be cut or copied from an original/start location of the content; and (3) responsive to user selection/input, cutting and/or copying the content from its original location; and automatically (or with user selection/input) inserting the content in the ending location, while the cursor is position at the start location; and subsequently automatically (or with user selection/input) jumping back to the end location and positioning the cursor at the end location with the inserted content. These features of the first principal embodiment as well as other features and functionality are described herein and illustrated by the remaining figures.

In one embodiment, the insertion function of the utility is triggered by the user indicating completion of the selection and accessing a menu that presents options for insertion of the cut/copied content into one or more previously tagged end locations. In another embodiment, the insertion function is automatically triggered by the utility when content is selected after an end location has been marked by the editor. In the latter embodiment, an option for "undo-selection" enables the user to "un-insert" a first selection. The user may also insert a second sequential selection if an error in selection resulted in the wrong content being inserted at the marked ending location. In another embodiment, multiple different contents may be inserted into a one or more marked end locations using a controlled selection feature or addition of multiple mark insertions, as described below.

To better understand the limitations that the embodiments herein overcome, reference is made to the conventional cut/copy and paste with the required intermediate scrolling process to find the destination location of the content being moved/copied. The conventional method, while more helpful than having to reproduce the content in its entirety at the ending location, includes several deficiencies that make the process somewhat cumbersome and time-consuming. For example, the document within which the user may be moving/copying content may be a very large document with a large number of pages. An editor (i.e., the user of the application in which the content is being edited) who/which is performing document review and updating/editing of content that involves moving content around this large document has to scroll through multiple pages (or page select) after remembering the location to which the cut/copied content has to be inserted to complete the move/copy. Often the editor does not recall the exact location and has to sort through the document for period of time to find the exact location that the editor may have previously found before deciding to go back to the content that the editor wants to copy into that location. In other applications, some editors utilize the cut and paste functionality to complete a final rearrangement of content. Even if an editor knows the ending location at the time of the cut and paste operation, the user still has to scroll through the document to that end location in order to complete the paste function.

For the various embodiments described herein, the operating system (OS) and/or the user application is/are enhanced with executable code (referred to as the advance editing and interfacing (AEI) utility) that enable these advanced editing functions within the application. With these executable code modules/elements provided within the available executable program/OS code, the editor is able to first mark an ending (destination) location for the content to be cut/copied, then select (copy or cut) the content(s) desired to be placed in that location. Following the selection of the content, the OS/application (via the executing code of the AEI utility) automatically populates the end location with the content. Alternatively, in one embodiment, the AEI utility 140 presents the editor with options on pre-marked or pre-selected ending locations and the editor may then select an insert function displayed to the user to populate the pre-selected location with the content.

In one embodiment, the content is automatically populated upon selection following an initial selection by the editor of the ending location. Utilizing this functionality, the editor identifies the ending location to which content is to be moved prior to selecting the content. The AEI utility stores the end location and monitors/waits for the editor to then perform a cut or copy function. When the content is automatically inserted, a tag or special marking is placed on or reflected within the content such that the editor is able to quickly view the newly inserted content at the ending location. The editor may undo the insertion utilizing the available undo options of the application/OS. Alternatively, in one embodiment, a special "AE undo" feature is provided along with any content that is automatically inserted via the functional applications of the described embodiments. The AE undo both removes the content from the ending location and also jumps back to the original/start location so that the editor is made aware (reminded) of the location from which the content was original copied/cut. If the content was originally cut (i.e., not copied), the AE undo also reinserts the content in the start location. Except for identifying the ending location and then finding the content, the editor does not have to scroll through the document to complete the actual retrieve with insert function once the content is selected.

Figure 2:
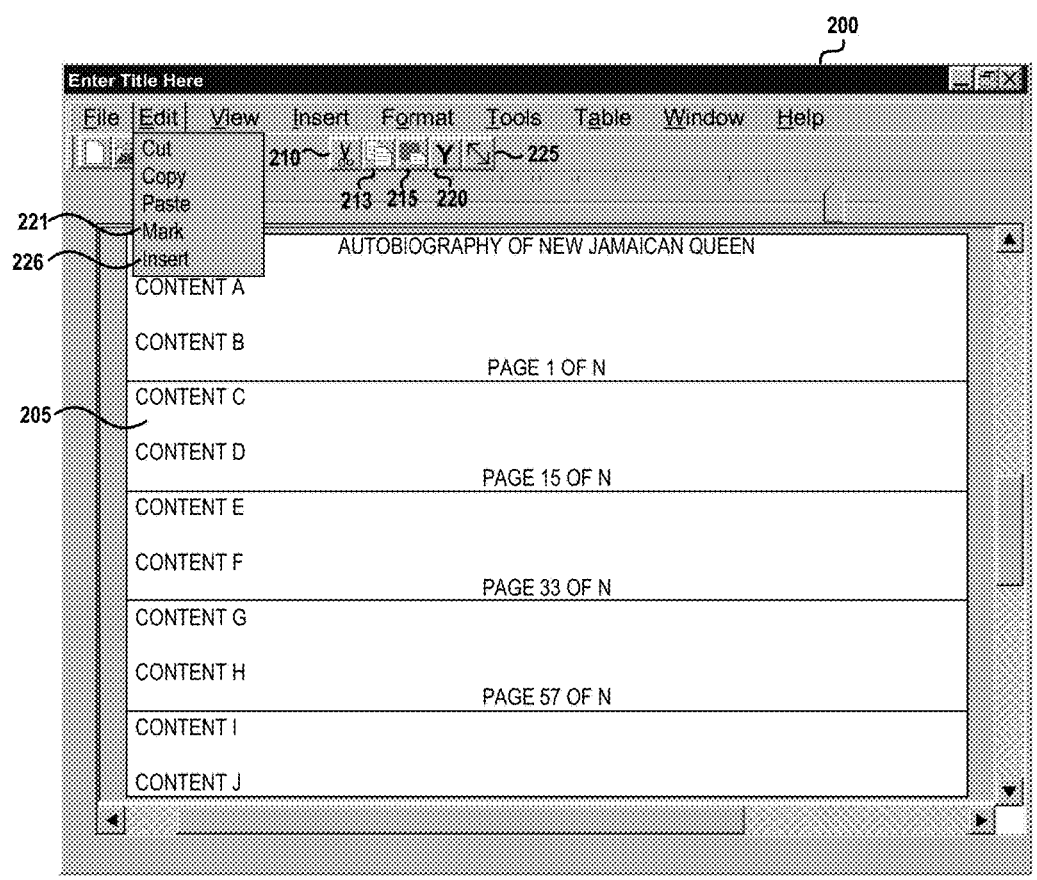
FIGS. 2 and 3 are graphical user interfaces (GUIs) of user applications that include retrieve and insert functionality according to one embodiment.
Figure 3:
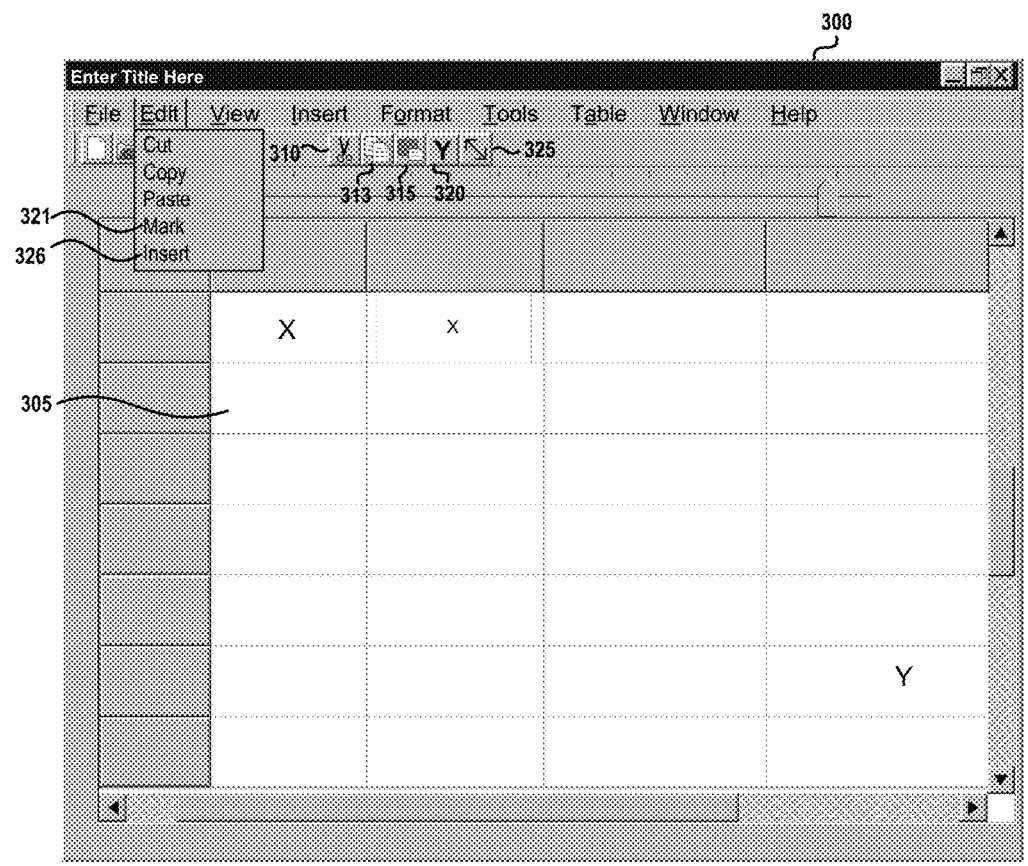

Turning now to FIGS. 2 and 3, which respectively depict screen shots of a graphical user interface (GUI) from Microsoft Word™ word processing software and MS Excel® spreadsheet application, within which the invention may be advantageously implemented. Application GUIs 200/300 respectively presents a document 205 and a spreadsheet 305, both of which comprise a plurality of content. Within document 205, the content is presented as different sub-components labeled as contents A-J. Within spreadsheet 305, each cell may represent a single content or a block of cells may be selected as a single content for performing AEI editing functions. As further shown, the application's GUI 200/300 includes a series of selectable menu items and displayed icons, representing editing functions that may be completed (with or on content) within the respective application. In addition to the cut icon 210/310, copy icon 213/313, and paste icon 215/315, both GUIs 200/300 are enhanced with an additional set of AEI editing icons. The additional set of AEI editing icons comprises a "mark" icon 220/320 and "insert" icon 225/325. In one embodiment, paste icon 215/315 provides the insertion features of the invention and thus no separate insert icon 225/325 is provided (or required). As further shown, pull-down edit menu includes mark selection 221/321 and, depending on implementation, insert selection 226/326.

It is understood that the features of the invention are applicable to a host of other user applications. Including MS Visio®, WordPerfect®, and other such applications. The features describe herein also applies to the mobile versions of these applications utilized in mobile devices such as smart phones (e.g., the MS Office mobile suite of applications). Specific reference and description herein of MS Word application is not intended to imply any limitation on the described embodiments, and the embodiments are to be afforded the broadest scope in line with the claims and specification.

It is contemplated that a single icon/menu item may be provided to complete both the mark and insert functionalities. In this implementation, the single icon is first selected at the end location, marking the spot of the insert. Following the selection of the content at the original/start location, the single icon is selected again to complete the two step "mark" and "retrieve/insert" process. Notably, an extension of this implementation would provide the user with a selection to complete either a mark or an insert, such that the single icon provides the specific user-selected function from among the two provided functions.

In one implementation, a user may sequentially select multiple end locations by "marking" each end location either by selecting the icon or the menu item. Following the sequence of end location markings, the editor then selects the content desired to be moved/inserted into these end locations. A single insert operation may then be utilized to populate copies of the same selected content within each of the pre-selected marked locations.

In one embodiment, AEI utility 140 may support multiple simultaneous insertions at the same or different end locations marked by the editor. In a more advanced implementation, the selection of a insert function may further provide an editing feature that enables the paragraphs surrounding the content being selected at the original location as well as the paragraphs surrounding the marked, end location to be display on a split screen view of the display to enable the user to intelligibly determine whether the content is best suited in the new, end location or should perhaps remain at its current original location or moved to a different end location. The presentation of surrounding text may be enabled by placing a cursor over the respective pop-up message 220/230, such that the user is able to (a) read the expanded content, i.e., original content with inserted content at the end location while at the original location (from pop-up message 220) and (b) read the content surrounding the cut content (assuming a move operation rather than a copy operation) at the original location while at the end location (from pop-up message 230).

Alternatively, the marking of end locations and subsequent insertions may be provided on a granular level, such that different selections of multiple, different content may be made and then individually inserted into select locations of multiple previously-marked end locations. In this embodiment, the insertions may complete in reverse order (i.e., last-marked-first inserted order) or in sequence order following the order in which the end locations were selected (first-marked-first inserted), or in an individual manner based on selection by the editor. The actual order may depend perhaps on software design or on user configuration (via the "tools" option, for example), available within the application. Again, another embodiment may entail providing the user with a listing of all previous end locations once the content is selected, such that the editor selects at which end location to insert the content.

Figure 4A:
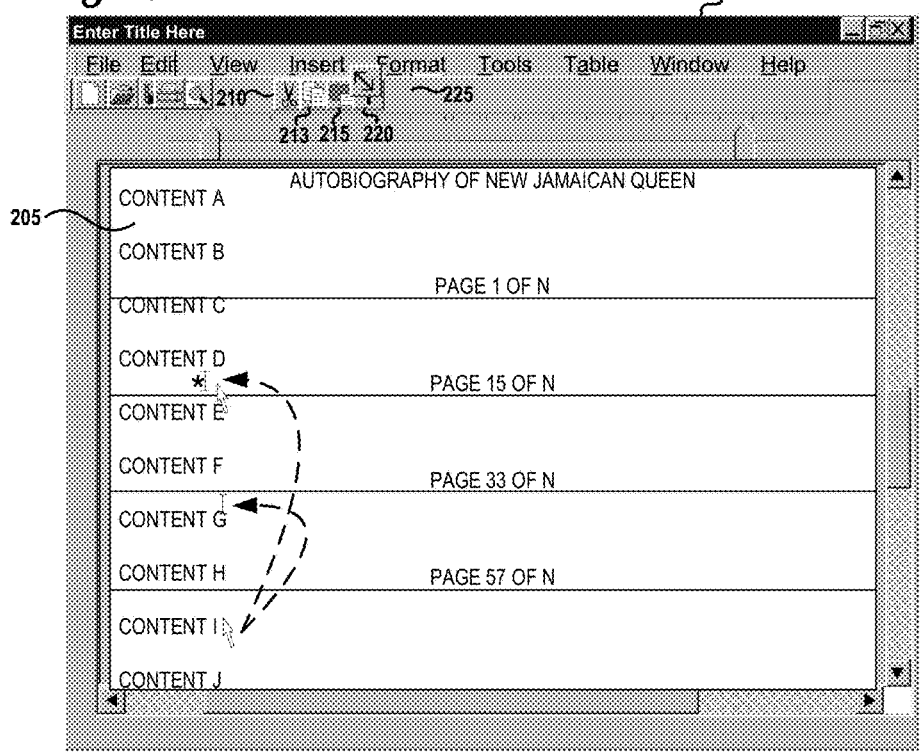
FIGS. 4A-4F are a series of GUIs illustrating the execution of retrieve with insert function within a word/text document according to one or more embodiments.

Use of the above new editing icons and editing menu selections are illustrated by the sequence of GUIs in FIGS. 4A-4D. In FIG. 4A, the user is presented with a document 400 containing content, labeled sequentially as content A though J, to simplify the description of the following processes. The document 400 is illustrated with title "Autobiography of NEW, Jamaican Queen," which includes 60 sequentially numbered pages of content. Five non-sequential pages, 1, 15, 33, 57 and 60 are shown with different portions of content (content A-J) within a single interface, in order to better illustrate the movement of content across multiple pages within a single document 400. It is understood that the interface in actual implementation does not displays more than one or two (and perhaps four) or some other number of pages within a single view. The presentation of the 60 pages of a single document within a single interface is provided solely to illustrate the retrieve and insert function across a document comprising a large number of pages.

The sequence of GUIs 200 of FIGS. 4A-4F illustrates a user-directed (AEI utility implemented) "retrieve and insert" operation, which moves content I from its original location on page 60 to an end location on page 15. As shown by FIG. 4A, the end location is between contents C and D on page 15. It is appreciated that the end location is not limited to an specific demarcation of previous content (e.g., end of paragraph) and the insertion may occur at any point within existing content, including in the middle of a paragraph or between words of a single sentence. Also, the size of the content being cut/copied and inserted into the end location can be a single letter, word, sentence, paragraph, multiple paragraphs, section, and any combination of such content within example document 400.

Figure 4B:
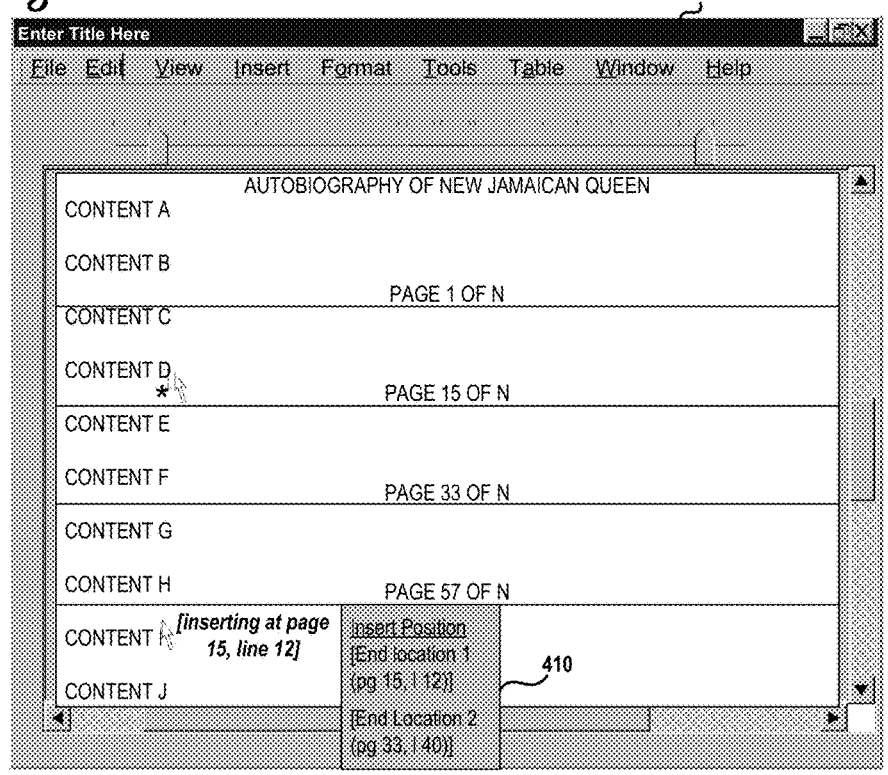
Figure 4C:
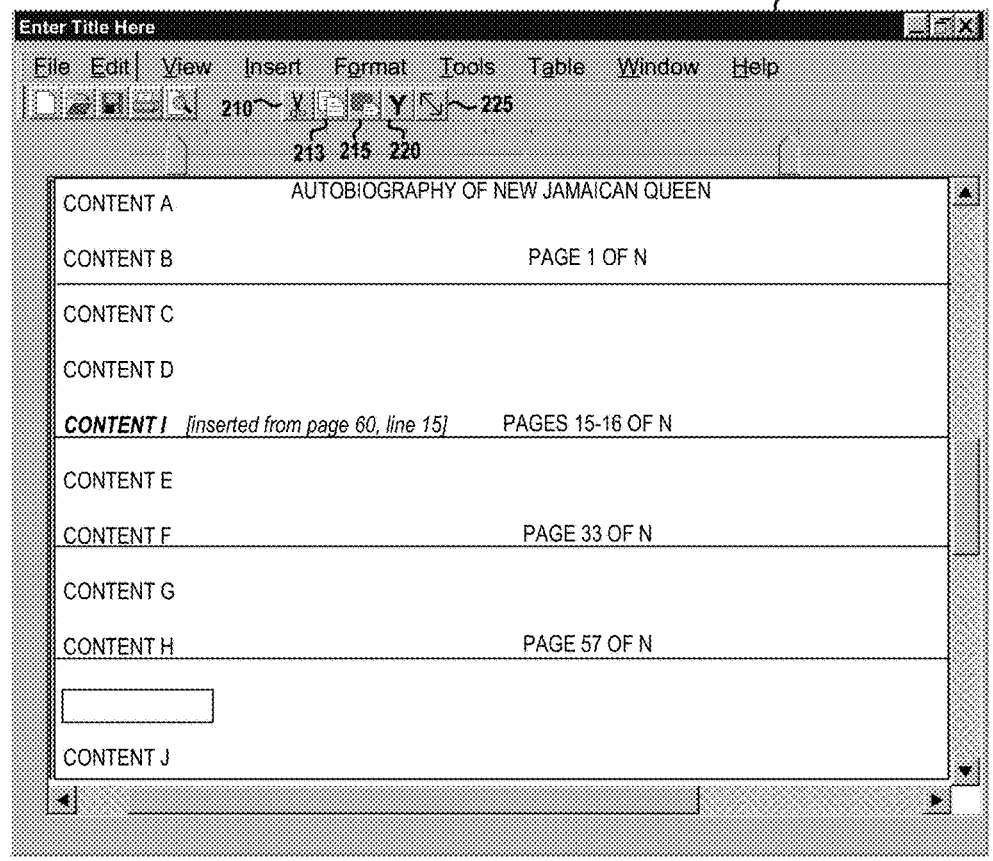
Figure 4D:
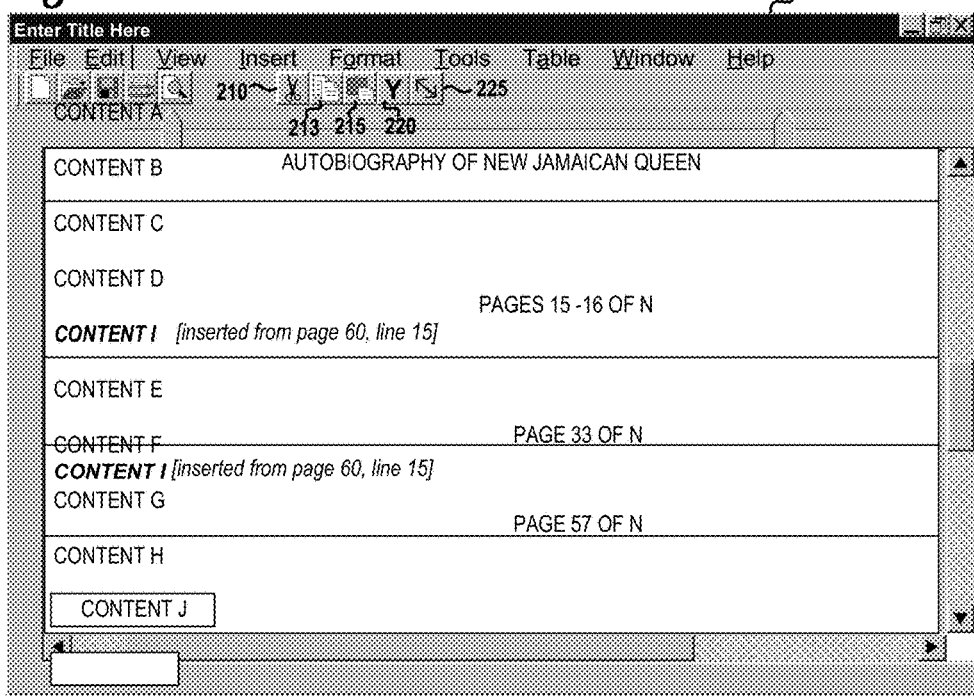
Figure 4E:
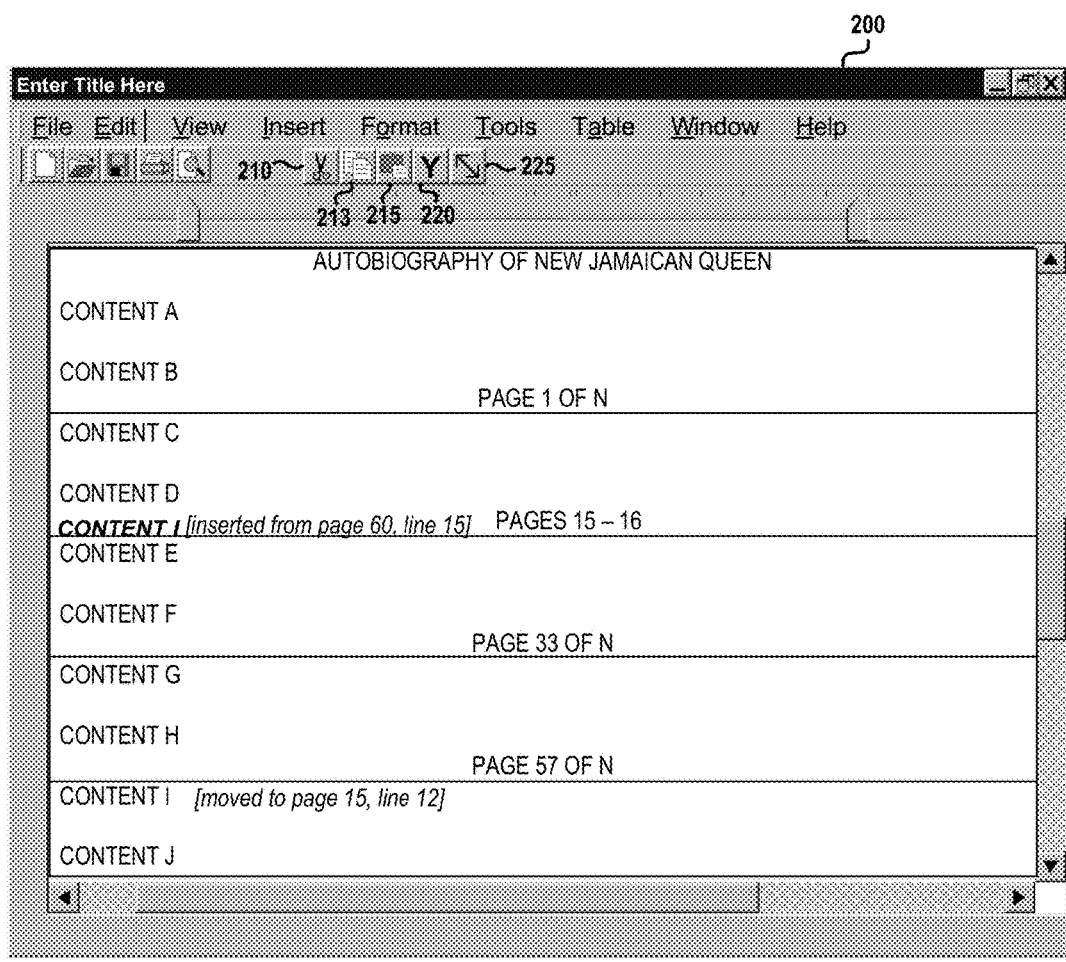
Figure 4F:
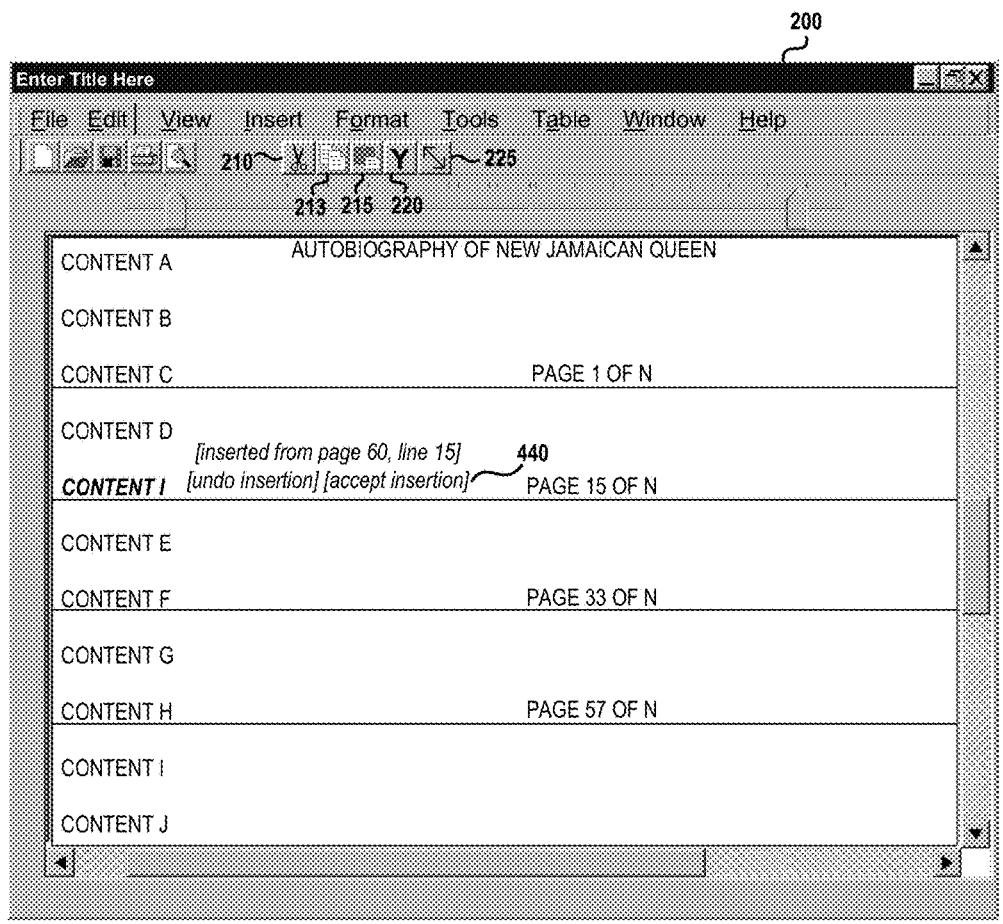
Figure 5:
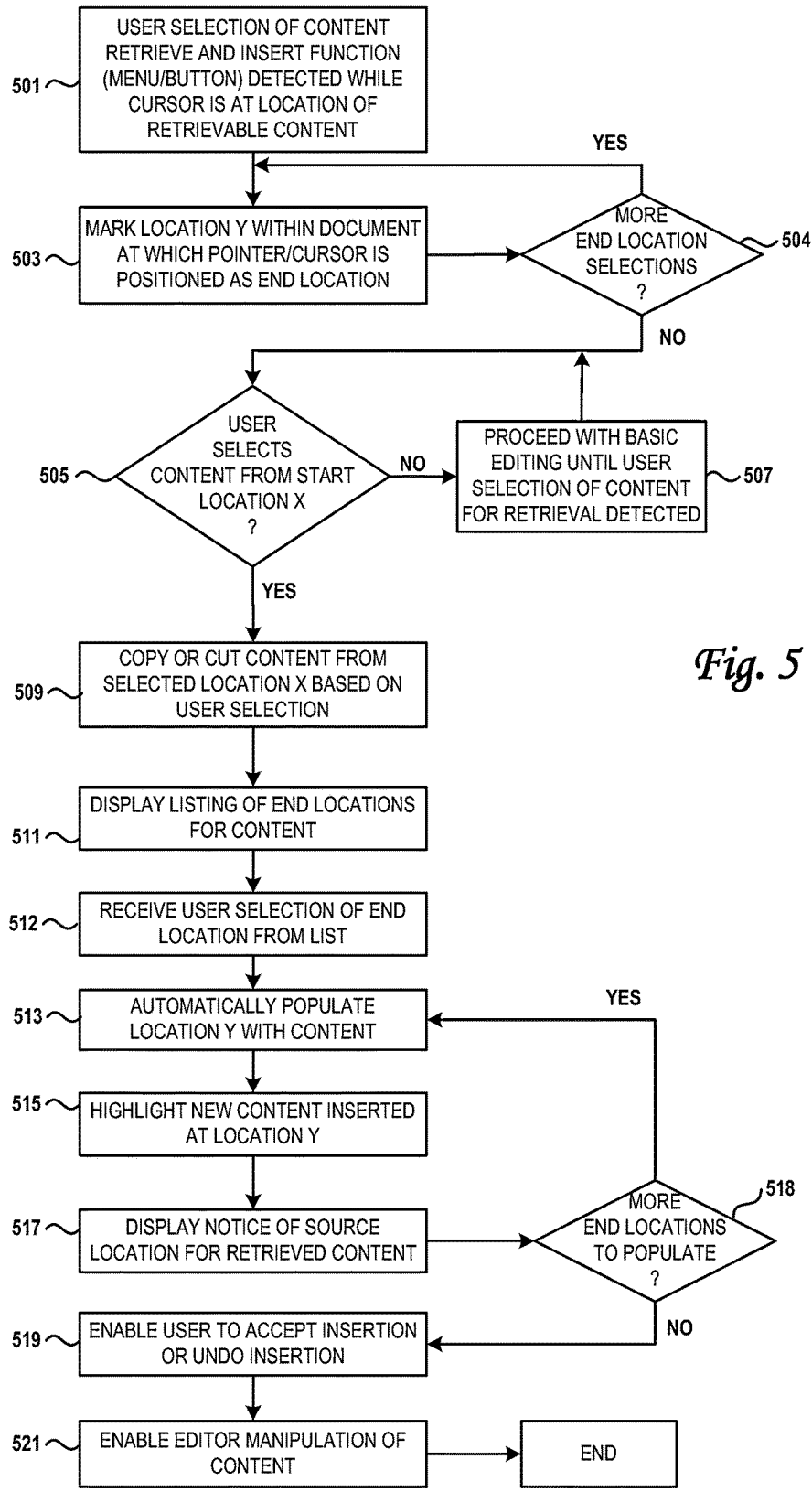
FIGS. 5-7 provide flow charts illustrating various aspects of the different methods for performing the content editing functions, including content retrieval and insertion function, in accordance with the described embodiments.
Figure 6:
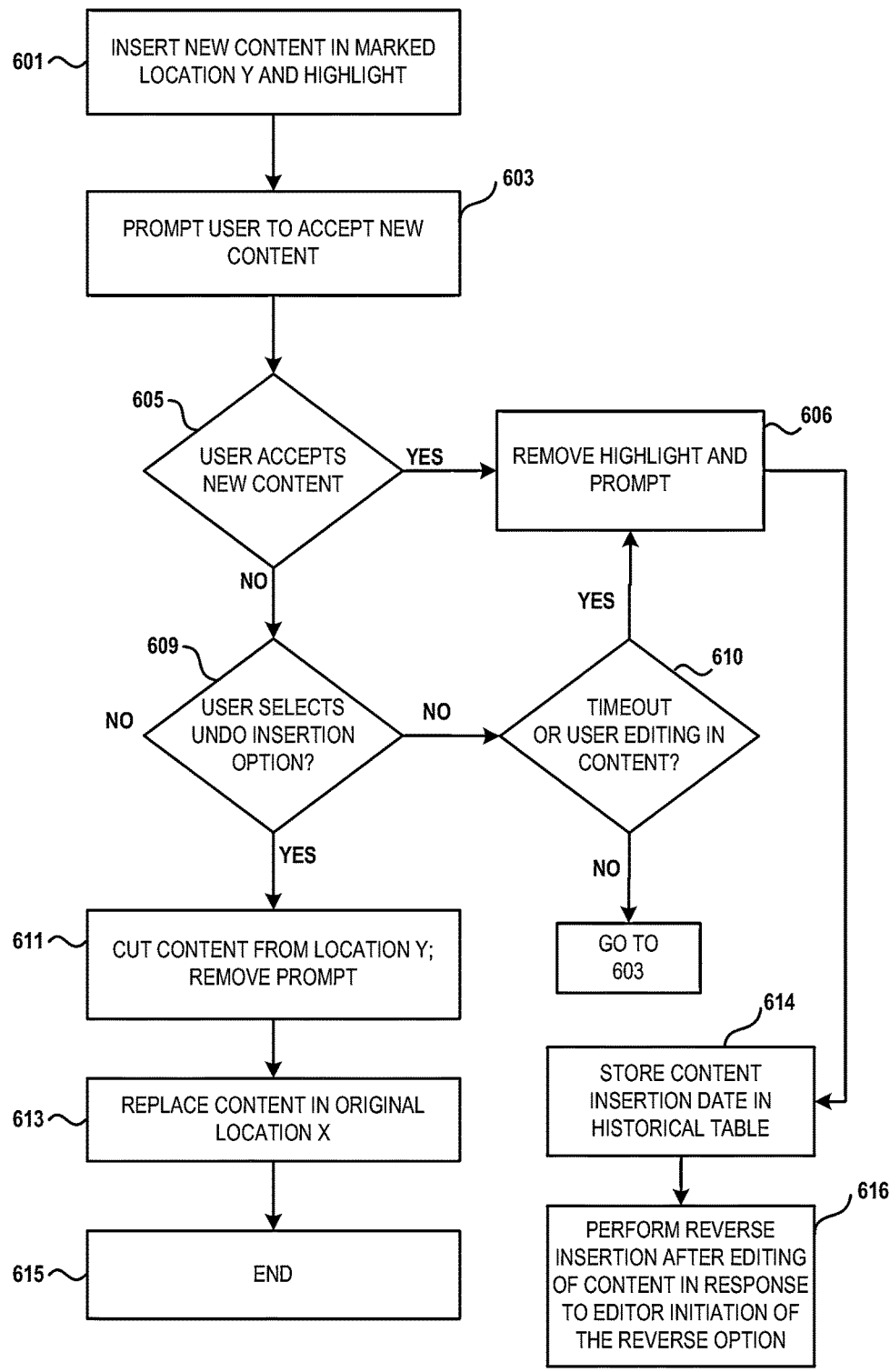
Figure 7:
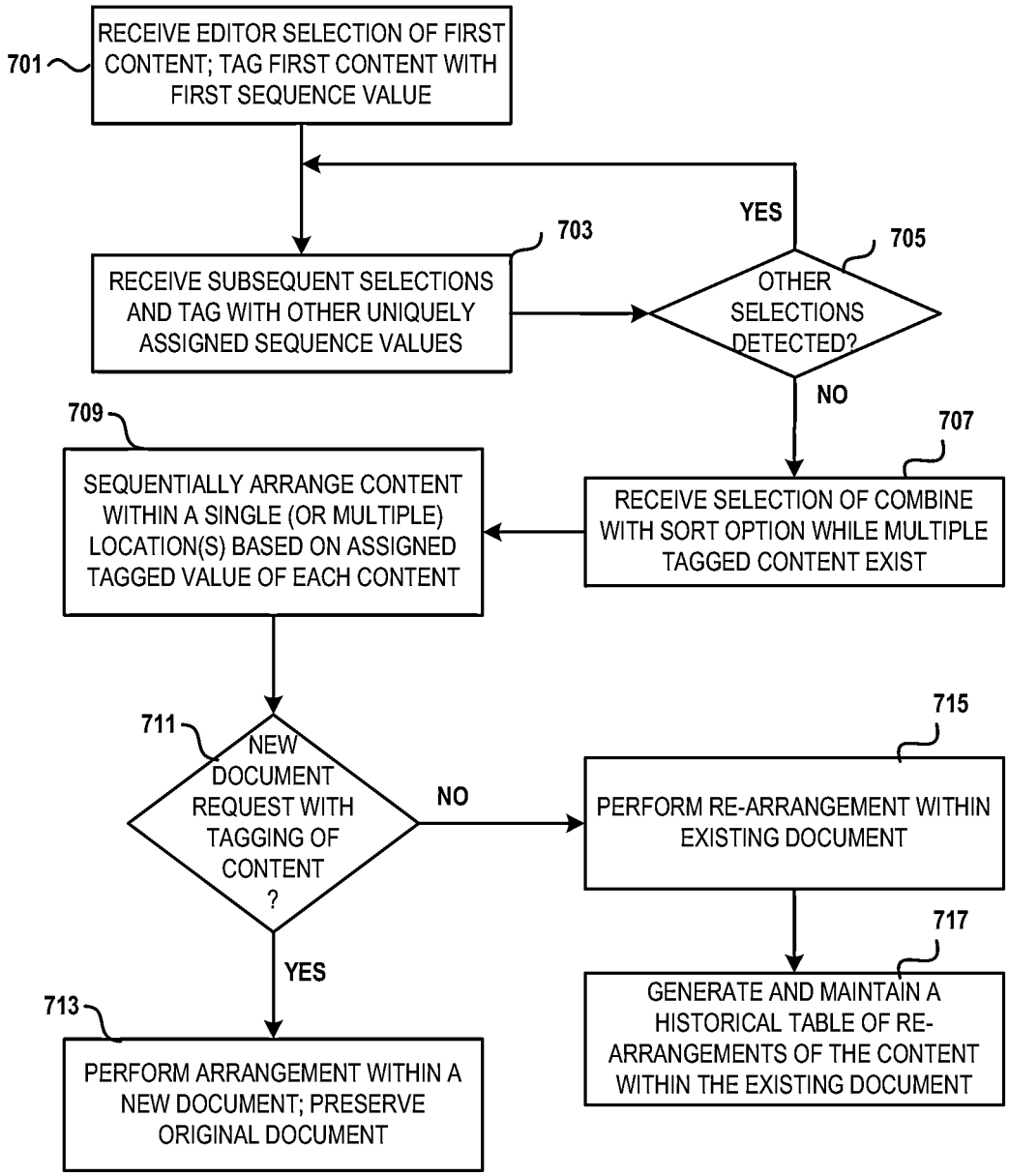

FIGS. 5-7 are flow charts illustrating various methods by which the above processes of the illustrative embodiments are completed. Although the methods illustrated in FIGS. 5-7 may be described with reference to components shown in FIGS. 1-4, it should be understood that this is merely for convenience and alternative components and/or configurations thereof can be employed when implementing the various methods. Certain portions of the methods may be completed by AEI utility 140 executing on CPU 105 of example DPS 110 (FIG. 1). For simplicity is describing the methods, all method processes are described from the perspective of either/both AEI utility 140 and DPS 100.

The flow chart of FIG. 5 illustrates specific steps of the method and is now described in conjunction with the description of FIGS. 4A-4E. FIG. 5 illustrates one embodiment of the method by which certain features of the first principal embodiment are implemented. FIG. 5 begins at block 501 at which AEI utility 140 receives one (or a sequence of) selection from the editor of the end location marker (i.e., via the menu item or icon), while the cursor is positioned at a first end location (Y). The AEI utility 140 marks the end location with a number of selections received from the editor while the cursor is positioned at the end location (block 503). In FIG. 4A, the user first places the cursor or mouse pointer at the location at which the editor desires to insert content. That location is marked/identified with an "*" for illustration, but may be identified using some visual or other marking mechanism or, in an alternate embodiment, the location may not be identified at all.

Selection of multiple end locations is provided via decision block 504, which iterates the selection until the utility detects selection of content from a different location. At decision block 505, the AEI utility 140 monitors for detection of a user selection of content. If no user selection of content is detected, the application continues normal editing functions within (507). At some time following the marking of the end location, the user identifies the content to be retrieved (moved or copied). Specifically, in FIG. 4B, the user selects content I, utilizing any one of the various selection mechanisms available. When the AEI utility 140 detects selection of content (content I), perhaps via a subsequent cut or copy function (followed by user selection of the insert function with the specific implementation) (block 509), the AEI utility provides a listing of the end locations marked by the editor (block 511). In one embodiment, the listing is provided via a child window 410 (FIG. 4B) and provides selectable options of end locations for selection by the editor (block 509). When only one end location has been selected, the specific end location is identified to the user prior to the content being moved or copied to the end location. With the window selection provided, the user selects an end location from the list, and the AEI utility 140 receives the selection (block 512) and automatically performs the insertion of the content (via an operation similar to or including a cut and paste or a copy and paste operation) (block 513). Specifically, the AEI utility inserts the content (content I) from the start location (page 60) into the end location(s) (page 15, FIG. 4C or pages 15 and 33, FIG. 4D) selected by the editor. With the end location updated with insertion of the selected content, the AEI utility 140 highlights the newly inserted content (block 515). The AEI utility also displays a source/original location of the inserted content (in response to a mouse over of the new content, in one embodiment) in the region of the document close o the location on the display in which the new content is presented (block 517). The AEI utility then determines, at decision block 518, whether there are any other end locations selected for insertion of content. If there are more end locations to populate, the AEI utility continues to insert the content in the relevant, pre-selected end locations. When there are no more insertions to be completed, the AEI utility prompts the editor for selection of an insert completion acceptance response (block 519), and then the utility enables the editor to being editing the content, if desired (block 521). The method then ends.

As shown by FIG. 4B, once the content is selected, the AEI utility cuts/copies the content from its current location, inserts the content (I) into/at the end location and immediately provides a message/notification to the editor (via message 220) of the insertion of the content into the end location. This notification enables the user to immediately proceed to the correct end location, without having to remember where, within the potentially large document, the end location is. Notably, when a copy of the content is selected by the editor, the original content remains within the original location, while a copy of the content is inserted at the end location (FIG. 4E). In either operation, the notification informs the editor of the end location while the cursor is still at the start location. In one embodiment, specific codes are embedded within the document to display the end locations and the original locations, and the codes are viewable by selecting a display option to show embedded codes.

In one embodiment, after inserting the content into the end location, the utility highlights the inserted content, using any one or more of a number of highlighting options, including bolding, italicizing, coloring, among others. This highlighting further notifies the user of the insertion of the content at that end location and enables the user to quickly move to the location to complete any other editing functions within the content or surrounding content. Highlighting the content indicates to the user where the content was inserted and also enables the user to decide if the location is correct, while further preventing the user from losing information about the original location when working in a large document.

In addition to highlighting the content, the utility may further provides a source tracker feature by which the editor is able to trace the start location of content that has been recently inserted by positioning the cursor over the content or by accessing a history table of content insertion. With the history table implementation, the AEI utility maintains a historical record of each move and copy operation performed by the utility, including a start location, end location(s), data and time information, and specific editor identification information, among other information that may be track within the historical table that is stored in memory or within storage.

In a more advanced implementation, the selection of a insert function may further provide an editing feature that enables the paragraphs surrounding the content being selected at the original location as well as the paragraphs surrounding the marked, end location to be display on a split screen view of the display to enable the user to intelligibly determine whether the content is best suited in the new, end location or should perhaps remain at its current original location or moved to a different end location. The presentation of surrounding text may be enabled by placing a cursor over the respective end location within the list of end locations. The editor is able to (a) read the before and after content, i.e., the original content at the end location, along with the to-be-inserted content within a child window display of the modified end location content while the cursor is still located at the original location and (b) read the content surrounding the cut content (assuming a move operation rather than a copy operation) at the original location while at the end location.

In one embodiment, and as illustrated by FIG. 4F, insert completion messages 440 are provided to the editor within a child window or as a displayed on screen message. Insertion completion messages 440 prompt the editor to accept the insertion or undo the insertion. FIG. 6 illustrates a process by which the user completes an insertion or undoes an insertion, according to one embodiment. FIG. 6 also illustrates the initiation and processing of a reverse function, according to one embodiment.

The undo-insertion functionality may be provided as a separate menu item or icon within FIG. 2 or 3, for example. The process begins with the AEI utility completing the insertion of new content in the end location and highlighting the new content (block 601). The AEI utility then displays the insertion completion message and prompts the editor to accept the insertion (block 603). When the editor accepts the new content, as determined at block 605, the utility removes the highlight and the prompt for acceptance or rejection of the insertion (block 607). However, when the editor rejects the insertion by selecting the undo insertion option, as determined at decision block 609, the inserted content is removed from the end location (block 611) and if cut from the start location, the utility replaces the content in the original start location (block 613). The process then ends at block 615.

Returning to decision block 609, when the user has not selected one of the confirmation responses, the utility determines at block 610 whether the pre-set time period for receiving a response has expired or the editor has began modifying the inserted content. If either condition occurs, the utility removes the highlight and completion message prompt at block 606. The utility then records the information related to the insertion within a history table (block 614). The utility then utilizes the stored historical information to perform a reverse insertion following editing of the inserted content by the editor (block 616). The reverse function is initiated by the editor utilizing selectable options of the utility.

Notably, the generation and displaying of an insertion completion message 440 is optional, particularly when the user does not wish to have to confirm each move operation while editing a large document. A mechanism for providing the historical listing of operations performed by AEI utility to the editor on request is also supported in one embodiment. With this embodiment, the user may later review the content editing selections made and undo those that the editor no longer wishes to make permanent within the document. In yet another embodiment, the insert confirmation message 440 is provided when the ASI utility first completes the insertion and remains active for a pre-set period of time (e.g., 10 seconds) thereafter. If the user does not select the undo within that time frame the selection times out and the message disappears from the screen. In yet another embodiment, the insert completion message 440 is displayed when the utility detects that the editor had position the pointer over the inserted content at the end location. In the described embodiment, any operation by the user with the content or surrounding content (or outside of a timed response period) causes the move to be permanent unless the user manually selects an undo function of the application. In yet another embodiment, the user is also able to right click and automatically undo the insertion via a drop down menu selection for "undo-insertion" or equivalent terminology. In this situation, the content is moved back to its original location.

However, a different implementation of the above functionality is further expanded to allow inserted content to be edited/modified at the end location, following which the AEI utility provides the editor with the option to reverse the insertion (move) with the modified/edited version of the inserted content. This "reversed insertion of modified content" functionality enables the editor to select content and move the content to a location at which the editing of the content is more easily performed (as in a section of the document or in another document that includes information required for the editing/modification of the inserted content so that the editor can easily access that information during editing of the content. Once the user is completed with the editing of the content, the user desires to return the edited content back to the original start location. The AEI utility this provides the "reversed insertion of modified content" function as one of the selectable options in a drop down menu or as an editing icon. Once the AEI utility 140 detects the user selection of that function while the edited/modified content is selected, the AEI utility 140 automatically performs a reverse move of the content from the end location back to the start location.

In a second principal embodiment, a method is provided that extends the above features of the first principal embodiment beyond a single content retrieve with insert function. In the second embodiment, the method enables efficient re-arrangement of multiple individual content (or blocks of content) within a single document or re-arrangement/movement of content across multiple documents. FIG. 7 generally provides portions of the method by which the second embodiment is implemented. With this embodiment, the AEI utility assigns numeric (or other sequenced) tags to different selected content. The tags indicate a selected order in which the editor wished the content to be presented in a final document or within the same document. Beginning at block 701, a first content selection (e.g., a sentence (or a sub-sentence, phrase, clause, word, etc.), a paragraph, a plurality of sequential paragraphs, or a plurality of pages, or an entire first document (among multiple documents), or a graphic or image, or a table or data) is received and tagged with a first tag (which may be a number or alphanumeric character or some other sequencing method). When numbers are utilized, the tags may range from one (1) to N, where N represents the largest integer number of individually tagged content that can be re-arranged within the particular implementation, and is either a design choice or a user settable variable. Following the tagging of the first selection, a second content selection is received and tagged with a second tag within the range of the sequence (e.g., a second number within the range of one to N, but not the same number as the first number) (block 703). This tagging of selected content may then be continued for N different content, with each new content selected in the sequence assigned a unique number from one (1) to N (block 705). In one implementation, the content may be selected across multiple different documents for ultimate ordered insertion into a single ending location of a single document. In one extension of the present embodiment, sub-content tagging is also supported, where a sub-sequence may be assigned (e.g., 1, 2a . . . n, 3, 4, where a . . . n, represents n sub-elements arranged as subparts of the second set of content that are to be arrange relative to each other following content 1 and before content 3).

In one embodiment, the ability to tag specific content is provided as a selectable option within a drop down menu accessible via one or more user inputs, such as with menu generated by right click of the pointing device button or opening of a menu option within the top level "Edit" menu function (e.g., in Microsoft OS documents). Other mechanisms are contemplated for accessing and selecting the option to tag specific content and for providing the further option of selecting a specific number within the allowable range to assign to the specific content, and these alternate mechanisms fall within the scope of the described embodiments. With the multiple different content tagged with unique numbers, the editor is then able to select a "combine with sort" function of the AEI utility 140. The utility receives the selection (block 707), and the utility (executed by the CPU 105 to) provides the following functional response: (a) sequentially arranging the individual content in the sequential order of the tags (i.e., based on the incremental sequence of the tags, e.g., 1, 2, 3, . . . N assigned to the selected content) (block 709); (b) if a new document is requested to be created (block 711) creating/generating a new document with the re-arranged ordering of content (block 713). This document would then be a "re-arranged version" of the original document, thus preserving the original document in case the editor desires to keep or reference back to the original document); and (c) allowing targeted insertion and ordering of different selected content using the retrieve with insert function for multiple different content in near simultaneous and ordered insertion at the ending location. When no new document is created, the re-arrangement occurs within the existing document (block 715), and the AEI utility 140 generates and maintains a historical record of the re-arrangements of content within the existing document (block 717). In one embodiment, a markup version of the original document is created when track changes is activated prior to the re-arrangement. The marked up version may show the tag (number) of the different content that is moved/re-arranged. The tag may be indicated proximate to the visible deleted content at the original content location. Selection of the tag then jumps to the new insertion point within the same document or a different document. Swapping of content between documents is also contemplated utilizing a similar mechanism.

While the tags are described and illustrated as integer numbers, it is contemplated that in other embodiments, other methods for tagging the content may be provided. For example, an alphabetized numbering scheme may be utilized (a-z), or a graphical indicator of the relevant importance/priority of the content (where a pre-established ordering scheme is provided/defined/programmed based on content relevance or priority). Pre-defined specialized icons may also be utilized in place of actual numbers or letters.

Also, in one embodiment, after the tags have been associated with their specific content and the tags are viewable within the document, the user is able to selectively change the assigned tag/number of a particular content. In one embodiment, this change is effected by selection of the tag and simple insertion of the correct tag value (number) in placed of the original tag value (so long as there is no conflict/overlapping in the currently allocated tag values). If the editor attempts to assign a previously assigned tag/number to a second content, an error message is displayed indicating that the tag/number has been previously and/or is currently allocated to another tagged content. In one embodiment, the remaining available numbers may be displayed to the editor when the editor selects new content to apply a tag to. In another embodiment, the AEI utility provides an option for the editor to jump to the content previously assigned the number that the editor desires to assign to the second content. The AEI utility further enables the editor to re-assign the tag of the first content to the second content by first assigning a different tag to the first content. Then, the software allows the editor to jump back to the second content and assign the second content with the tag that was previously assigned to the first content. In one embodiment, the AEI utility may allow the user to instead override a previous tag assignment and forced the assignment of a previously assigned tag to the second content. The AEI utility then immediately prompts the editor to select a different tag number for the first content whose tags was assigned to the second content. The described conflict with tags may occur, for example, where the first content is initially assigned the number 1, and the editor then decides that a subsequently tagged content is desired to be first in the re-arranged ordering of content. Rather than having to first re-assign the first content's tag number, the editor is allowed to override the previous assignment by forcing the tag number (1) on the subsequent content, and the editor is then prompted to select a different tag number for the first content. In one implementation, the tag assigned to each of the subsequent content in the ordered tag sequence is automatically incremented to the next tag value in sequence when a forced insertion of content occurs that pushes a previously tagged content down in sequence.

With a mobile device implementation, the various features of both principal embodiments enables easy and quick editing on the go, while directly accounting for the limited viewable screen space with which the device user is able to track where content is being moved from or relocated to. The features are thus programmed within mobile operating systems and applications or provided as a downloaded utility for use on existing mobile devices. Generally, the ability to select content from different documents and re-located them to new documents or to one of the open documents also provides for great flexibility in creation of new or modified documents from previous documents which have content of value within the new document. Importantly, this flexibility is provided without the user having the scroll through the new document to locate the location in which to paste/insert previously cut/copied content. Working from the new document provides the added benefit of knowing exactly what content is needed at the specific location in which the content is later inserted.

Utilizing the features of the invention, a user no longer goes through the standard steps of: (1) mentally mark a first location for insert (or write down on paper), (2) scroll to the content desired to insert at that first location, (3) copy/cut the content from the second location, (4) remember the first location and/or (5) try to find the first location by scrolling back/forward through the document, (6) positioning the cursor at the first location, and (7) pasting the content at the first location.

With the features provided by the invention, the user now performs the following steps: (1) mark the first location, (2) scroll to the content desired to insert at that first location, (3) copy/cut the content from the second location, and (4) automatically insert the content at the first location via the insert function. The user eliminates at least three steps of the conventional process. Further, the user is able to eliminate much of the mental and physical process required in determining if the move fits the intended location or whether the original location reads correctly with the content removed. These latter features are provided by the pop-up messages 420/430 as described above. Additional benefits are provided by the invention as described herein an as reasonably suggested thereby. All such equivalences are assumed to fall within the scope of the invention.

The flowcharts and block diagrams in the various figures presented and described herein illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the flow charts above, one or more of the methods are embodied in a computer readable medium containing computer readable code such that a series of functions are performed when the computer readable code is executed (by a processing unit) on a computing device. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. In an electronic device having a processor executing one or more applications that provide selectable content, a method comprising:
   receiving selection of at least two different selectable contents from one or more available application user interfaces;
   assigning a sequential tag to at least one of the different selected content, wherein the sequential tag indicates a selected order in which the different selected content are to be presented at an end location within an editable application user interface document, wherein the selected order is determined from a listing of the different selected content;
   completing a retrieve and insert operation by inserting of the selected content within the end location in response to receipt of a response to a prompt, which response indicates completion of a current selection of content;
   inserting the different selected content into the end location in the selected order corresponding to the sequential tag of each respective selected content relative to each other sequential tag assigned; and
   in response to receipt of a different response indicating that additional content is to be selected and sequentially arranged prior to concurrent insertion of all selectable content into the end location: requesting entry of a specific sequential tag for the selected content; assigning to the selected content one of the sequential tag received and a default sequential tag generated when no sequential tag is received within a pre-set timeout period; and returning to a selection mode for selection of one or more other content from the application user interfaces.

2. The method of claim 1, wherein the inserting of the different selected content comprises dynamically arranging an order of presentation of the different selected content based on at least one of the sequential tag assigned to the at least one different selected content and an order of selection of the at least two different selected contents.

3. The method of claim 1, wherein the sequential tag can be one of a number, an alphanumeric character, and a sequencing method and each different sequential tag represents a different relative placement within an ordering of the at least to different selectable contents.

4. The method of claim 1, wherein the final document is a different document from at least one of the application user interfaces from which one or more of the at least two different selected content was selected, wherein incorporation and ordering of selected content from multiple different application user interfaces into a single application user interface document is provided.

5. The method of claim 1, further comprising:
   identifying a set of contents as sub-contents;
   tagging at least one sub-content within the set of contents with a sub-content tag; and
   arranging the sub-content within the set of contents in sequence relative to each other sub-content based on the sub-content tag, while arranging the set of contents in sequence relative to other selected content within the end location, relative to the sequential tag assigned to specific ones of the set of contents and the other selected content.

6. The method of claim 1, wherein the different selected content can comprise one or more of a sentence, a sub-sentence, a phrase, a clause, a word, a paragraph, a plurality of sequential paragraphs, a plurality of pages, an entire document when multiple documents are utilized, a graphic, an image, a table, and data.

7. The method of claim 1, further comprising:
   receiving a first input which marks the end location within a first application user space as an end location for later insertion of content that is not yet selected, wherein an ending location to which content is to be moved is identified prior to selecting the content;
   detecting selection of content from one or more application user spaces available via the electronic device; and
   the processor generating a prompt for insertion of the selected content at the end location within the editable application user interface document;
   wherein the tagging enables ordered insertion into a single ending location of a single document.

8. The method of claim 1, further comprising:
   in response to a deletion of selected content from its original location, visibly displaying a first indicator at or proximate to the original location indicating that previous content from that original location was moved to the end location.

9. The method of claim 1, further comprising:
   displaying one or more original location (OL) indicator proximate to respective selected content inserted within the end location to identify a corresponding original location from which the inserted content was obtained.

10. The method of claim 1, comprising:
    tagging a first selected content with a first sequential tag;
    tagging a second selected content with a second sequential tag that is different from the first sequential tag; and arranging the first selected content and the second selected content within the end location in an order corresponding to a sequence value of the first sequential tag relative to the second sequential tag.

11. The method of claim 10, further comprising:
displaying a menu comprising one or more selectable options that enable tagging of specific selected content; and
providing, within the one or more selectable options, an option of selecting a specific tag value, within an allowable range of tag values making up the sequence, to assign to the specific selected content.

12. The method of claim 1, wherein inserting further comprises:
presenting a sequence of selectable functions that includes a "combine and sort" function;
receiving an input selecting the "combine and sort" function for inserting the selected content; and
in response to receiving an input selecting a "combine with sort" function, sequentially arranging the individual content in the sequential order of the sequential tags.

13. The method of claim 1, wherein inserting further comprises:
presenting a sequence of selectable functions that includes an option to create a new document;
receiving an input selecting the option for new document creation with the at least two selected content; and
in response to receiving the input selecting the option for new document creation, generating a new document presenting an ordered arrangement of the at least two selected content.

14. The method of claim 13, wherein generating the new document further comprises presenting the new document as a "re-arrange version" of an original document, and preserving the original document.

15. The method of claim 14, further comprising:
in response to detecting activation of a track changes feature prior to a re-arrangement of the original document:
creating a mark-up version of the original document; and
showing within the marked up version the sequential tags of the different content that is re-arranged within the document.

16. The method of claim 15, further comprising:
displaying the sequential tag proximate to a deleted content at an original content location; and
in response to detecting a selection of the sequential tag at the original content location, jumping to a new insertion point of the specific content within one of the same document and a new document created and placing a cursor at the new insertion point.

17. The method of claim 1, further comprising:
presenting one or more options for one or more pre-selected ending locations including an insert function; and
enabling selection of an insert function that is displayed in order to populate the pre-selected ending location with the specific content, wherein the specific content is automatically populated upon selection, following an initial selection of the ending location.

18. The method of claim 17, further comprising:
in response to the specific selected content being automatically inserted, placing a special marking reflected within the specific content to enable an editor to quickly view the specific selected content at the first location as newly inserted content.

19. The method of claim 1, further comprising:
providing one or more undo options to enable an undo of the inserting, wherein a special undo feature is provided along with the specific content and any content that is automatically inserted into an end location via a retrieve and insert operation, wherein the special undo feature both removes the specific content from the ending location and causes a cursor to jump back to the original location, whereby a reminder of the original location of the specific content is provided.

20. The method of claim 19, further comprising:
detecting selection of special undo feature; and
in response to detecting the selection of the special undo feature while the specific selected content has been deleted from the original location, reinserting the specific selected content in the original location.

21. The method of claim 1, further comprising:
presenting a sequence of selectable functions that includes an option to swap a first selected content at a first location within a first editable document with a second selected content at a second location;
receiving an input selecting the option to swap locations of two selected contents; and
in response to receiving the input selecting the option for swapping the location of two selected contents, automatically swapping the second selected content into the first location within the first editable document and moving the first selected content to the second location of the second content.

22. The method of claim 1, further comprising:
following each selection detected, receiving a second input providing one of a cut operation and a copy operation for the selected content; and
the processor, in response to receiving the second input following (i) the content being selected after (ii) first registering receipt of the first input marking the end location, automatically generating a prompt for one of: (a) insertion of the selected content at the end location within the editable application user interface document; and (b) arrangement of the selected content relative to other selected content by assigning a sequential tag to the selected content.

* * * * *